United States Patent
Hashimoto et al.

(10) Patent No.: US 9,800,809 B2
(45) Date of Patent: Oct. 24, 2017

(54) IMAGING APPARATUS, IMAGING SYSTEM, AND METHOD FOR REDUCING A DIFFERENCE IN RESOLUTIONS

(71) Applicant: CANON KABUSHIKI KAISHA, Tokyo (JP)

(72) Inventors: Seiji Hashimoto, Yokohama (JP); Yasushi Matsuno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/423,891

(22) Filed: Feb. 3, 2017

(65) Prior Publication Data
US 2017/0150074 A1   May 25, 2017

Related U.S. Application Data

(62) Division of application No. 14/564,488, filed on Dec. 9, 2014, now Pat. No. 9,602,751, which is a division
(Continued)

(30) Foreign Application Priority Data

Sep. 8, 2011   (JP) .................................. 2011-196349

(51) Int. Cl.
    *H04N 5/378*   (2011.01)
    *H04N 5/374*   (2011.01)
    (Continued)

(52) U.S. Cl.
    CPC .......... *H04N 5/3575* (2013.01); *H04N 5/378* (2013.01); *H04N 5/37455* (2013.01)

(58) Field of Classification Search
    CPC ............................. H04N 5/378; H04N 5/3742
    (Continued)

(56) References Cited

U.S. PATENT DOCUMENTS

| 4,742,392 A | 5/1988 | Hashimoto |
| 4,935,808 A | 6/1990 | Hashimoto |

(Continued)

FOREIGN PATENT DOCUMENTS

| CN | 101600057 A | 12/2009 |
| CN | 101753782 A | 6/2010 |

(Continued)

OTHER PUBLICATIONS

European Search Report dated Dec. 18, 2012, in European Application No. 12183076.4-2202.
(Continued)

*Primary Examiner* — Lin Ye
*Assistant Examiner* — Chan Nguyen
(74) *Attorney, Agent, or Firm* — Fitzpatrick, Cella, Harper & Scinto

(57) ABSTRACT

An imaging apparatus comprises: a pixel generating a photoelectric conversion signal; a comparator configured to compare a base signal based on the pixel at a reset state with a time-changing first reference signal, and for comparing an effective signal based on the pixel at a non-reset state with a time-changing second reference signal, wherein the second reference signal has a larger time-changing ratio than that of the second reference signal; a counter configured to count a first count value until an inversion of a magnitude relation between the base signal and the first reference signal, and configured to count a second count value until an inversion of a magnitude relation between the effective signal and the second reference signal; a correcting unit configured to correct a difference of resolutions of the first and second count values, and configured to correct a difference between the first and second count values corrected.

7 Claims, 9 Drawing Sheets

Related U.S. Application Data of application No. 13/592,969, filed on Aug. 23, 2012, now Pat. No. 8,941,753.

(51) Int. Cl.
*H04N 5/357* (2011.01)
*H04N 5/3745* (2011.01)

(58) Field of Classification Search
USPC ...................................................... 348/222.1
See application file for complete search history.

(56) References Cited

U.S. PATENT DOCUMENTS

| | | | |
|---|---|---|---|
| 6,518,910 | B2 | 2/2003 | Sakuragi et al. |
| 7,705,897 | B2 | 4/2010 | Muramatsu |
| 7,924,335 | B2 | 4/2011 | Itakura et al. |
| 7,973,695 | B2 | 7/2011 | Kudo |
| 7,982,652 | B2 | 7/2011 | Simony et al. |
| 8,174,598 | B2 | 5/2012 | Ebihara |
| 8,310,581 | B2 | 11/2012 | Itakura et al. |
| 8,325,255 | B2 | 12/2012 | Aruga et al. |
| 8,625,012 | B2 | 1/2014 | Yuan et al. |
| 8,687,098 | B2 | 4/2014 | Aruga et al. |
| 8,810,704 | B2 | 8/2014 | Ebihara |
| 8,922,668 | B2 | 12/2014 | Ota |
| 2008/0136948 | A1 | 6/2008 | Muramatsu |
| 2009/0027533 | A1 | 1/2009 | Itakura et al. |
| 2009/0303362 | A1 | 12/2009 | Ebihara |
| 2010/0039306 | A1 | 2/2010 | Simony et al. |
| 2010/0165164 | A1 | 7/2010 | Muramatsu |
| 2010/0194956 | A1 | 8/2010 | Yuan et al. |
| 2010/0253560 | A1 | 10/2010 | Kudo |
| 2011/0013050 | A1 | 1/2011 | Aruga et al. |
| 2011/0037868 | A1 | 2/2011 | Ota |
| 2011/0134295 | A1 | 6/2011 | Shigeta et al. |
| 2011/0157442 | A1 | 6/2011 | Itakura et al. |
| 2011/0292261 | A1 | 12/2011 | Hwang et al. |
| 2012/0008028 | A1 | 1/2012 | Egawa |
| 2012/0194723 | A1 | 8/2012 | Ebihara |
| 2013/0107082 | A1 | 5/2013 | Aruga et al. |

FOREIGN PATENT DOCUMENTS

| | | |
|---|---|---|
| CN | 101800837 A | 8/2010 |
| CN | 101959026 A | 1/2011 |
| EP | 2 071 831 A1 | 6/2009 |
| JP | 2007-218987 A | 10/2007 |
| JP | 2008-136043 A | 6/2008 |
| JP | 2009-033305 A | 2/2009 |
| JP | 2009-033381 A | 2/2009 |
| JP | 2010-045789 A | 2/2010 |
| JP | 2010-259051 A | 11/2010 |
| JP | 2011-041091 A | 2/2011 |
| WO | 2010/137244 A1 | 12/2010 |

OTHER PUBLICATIONS

Korean Office Action dated Sep. 18, 2014, in Korean Application No. 10-2012-0098618.
Chinese Office Action dated Jan. 23, 2015 in Chinese Patent Application No. 201210330152.9.
Japanese Office Action dated Jun. 2, 2015 in Japanese Patent Application No. 2011-196349.
European Office Action dated Sep. 17, 2015 in EP Application No. 12 183 076.4.

FIG. 6A
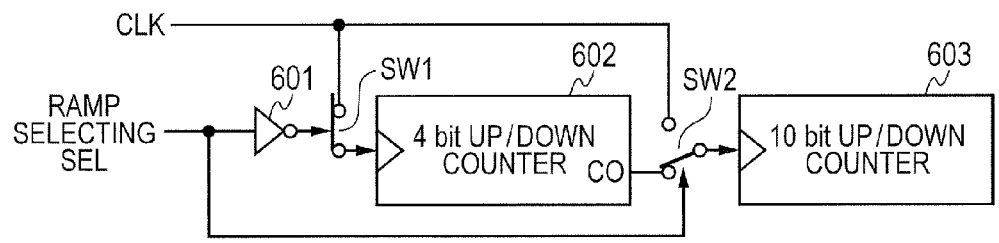
COUNTER
FIG. 6B
COUNTER DATA IMAGE VH
FIG. 6C
COUNTER DATA IMAGE VL
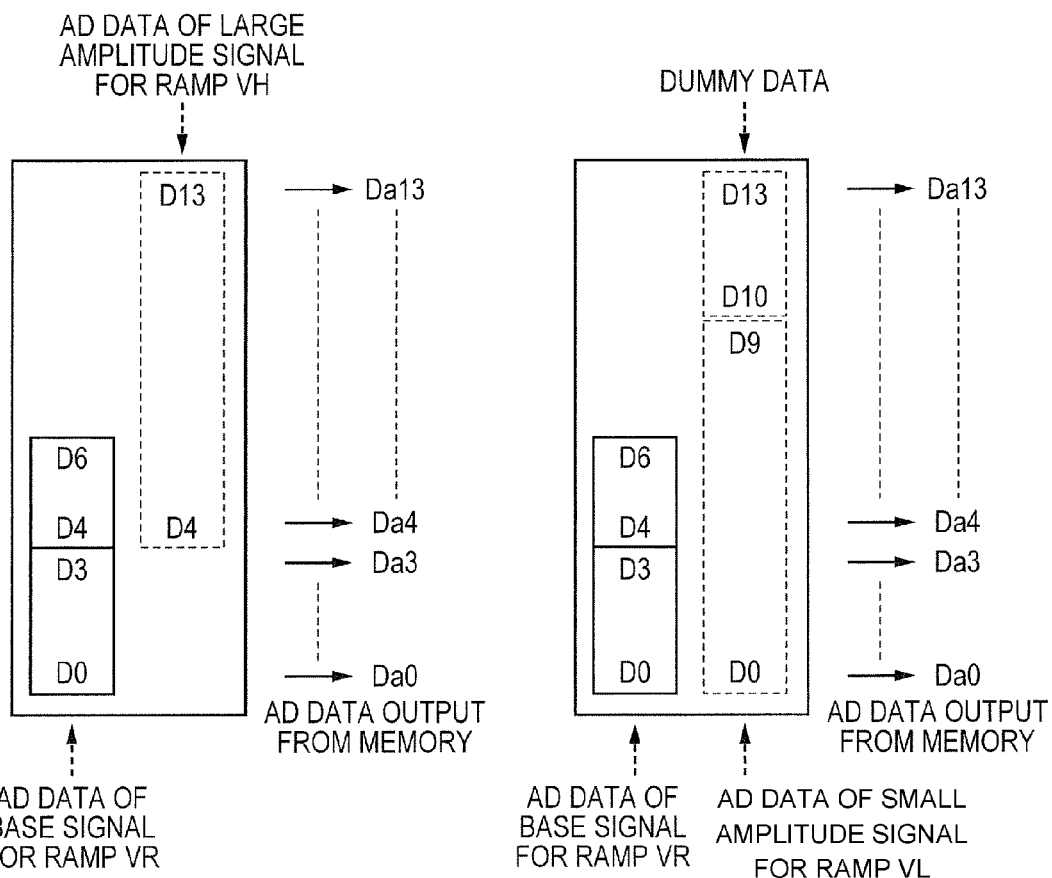

IMAGING APPARATUS, IMAGING SYSTEM, AND METHOD FOR REDUCING A DIFFERENCE IN RESOLUTIONS

This application is a divisional of application Ser. No. 14/564,488, filed Dec. 9, 2014, which is a divisional of application Ser. No. 13/592,969, filed Aug. 23, 2012.

BACKGROUND OF THE INVENTION

Field of the Invention

The present invention relates to an imaging apparatus.

Description of the Related Art

In recent years, a CMOS image sensor subjects a pixel signal to analog-digital conversion (hereinafter referred to as A/D conversion) in a sensor device. Here, a high-speed and high-resolution A/D conversion process technique is known. The technique of Japanese Patent Application Laid-Open No. 2007-281987 includes inputting an image signal into a plurality of comparators, comparing the image signal with reference signals having different time changes from each other, and synthesizing the count data of a reset level (hereinafter referred to as base signal) N of a pixel signal and an effective signal S, after S-N processing. Thereby, the technique can acquire the A/D conversion data with a large number of bits.

SUMMARY OF THE INVENTION

In a conventional technique, there is a problem of accuracy in the synthesized A/D conversion data. The technique of Japanese Patent Application Laid-Open No. 2007-281987 includes synthesizing an A/D conversion data as a high-accuracy data, by positioning the A/D conversion data (j bit) obtained with a reference signal having a small temporal change at the least significant bit including a quantization error of the A/D conversion data (i bit) obtained with a reference signal having a larger temporal change, but has a small effect of enhancing A/D conversion accuracy. In addition, the technique has two comparators provided in each row, and accordingly has a concern that a circuit scale increases.

According to the present invention, an imaging apparatus comprises: a pixel configured to generate a signal by a photoelectric conversion; a comparator configured to compare a base signal based on the pixel at a reset state with a time-changing first reference signal, and to compare an effective signal based on the pixel at a non-reset state with a time-changing second reference signal, wherein the second reference signal has a larger time-changing ratio than that of the second reference signal; a counter configured to count a first count value until an inversion of a magnitude relation between the base signal and the first reference signal, and configured to count a second count value until an inversion of a magnitude relation between the effective signal and the second reference signal; a correcting unit configured to correct a difference of resolutions of the first and second count values, and configured to correct a difference between the first and second count values corrected.

The technique according to the present disclosure can enhance the accuracy of the analog-digital conversion while suppressing the increase of a circuit scale.

Further features of the present invention will become apparent from the following description of exemplary embodiments with reference to the attached drawings.

BRIEF DESCRIPTION OF THE DRAWINGS

FIGS. 6A, 6B and 6C are explanatory drawings of a bit shift of an A/D conversion data.

DESCRIPTION OF THE EMBODIMENTS

Preferred embodiments of the present invention will now be described in detail in accordance with the accompanying drawings.

First Embodiment

Figure 1:
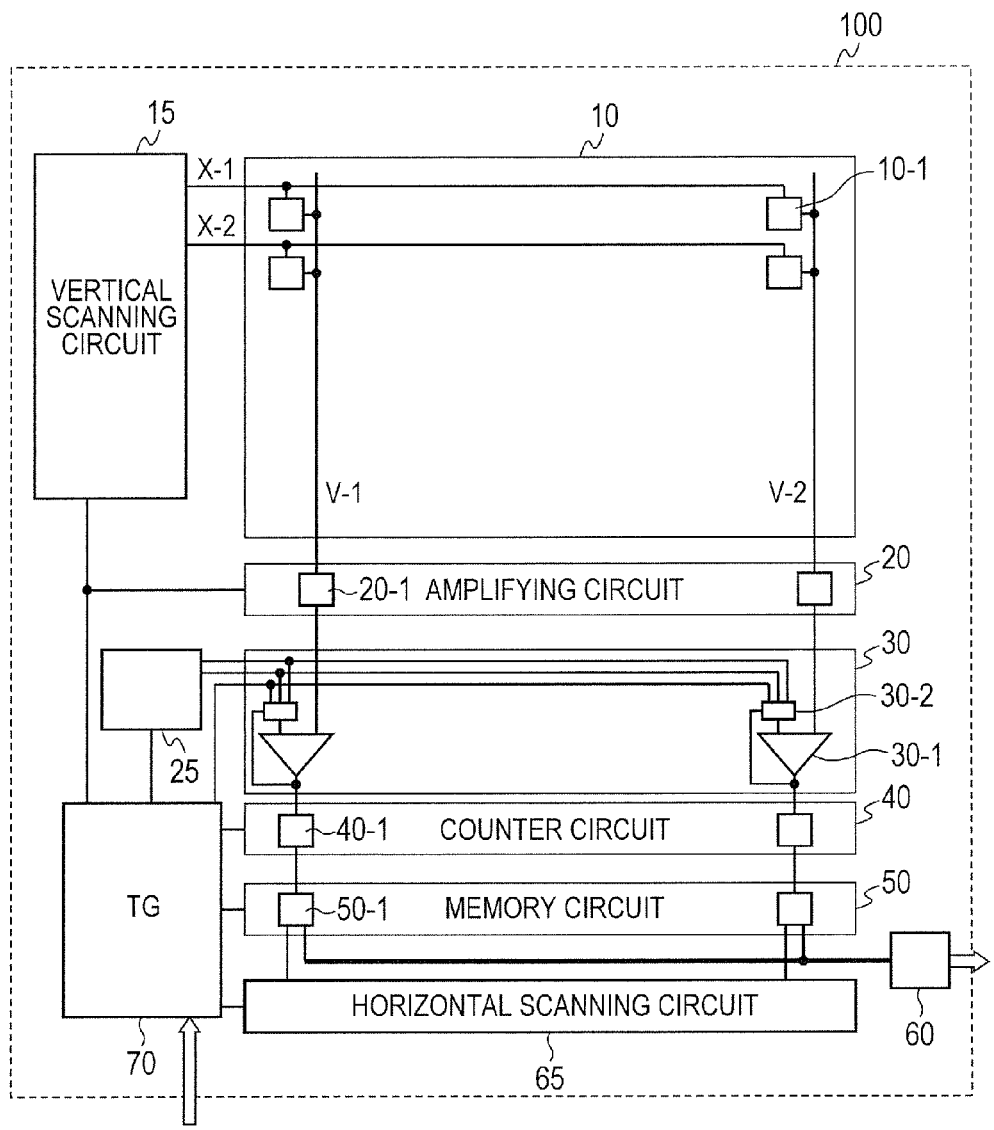
FIG. 1 is a block diagram of an imaging device according to a first embodiment of the present invention.

FIG. 1 is a schematic block diagram of an imaging device 100 according to a first embodiment of the present invention. The imaging device 100 is an imaging device which is referred to as a CMOS image sensor; and subjects a light-received image of an object to photoelectric conversion, and outputs the electrical signal as a digital signal. The imaging device 100 has pixel units 10, a vertical scanning circuit 15, an amplifying unit 20, a ramp signal generating circuit (reference signal generating circuit) 25, a comparison unit 30, a counter unit 40, a memory unit 50, an output circuit 60, a horizontal scanning circuit 65, and a timing generating circuit (TG) 70. The pixel unit 10 has a plurality of pixels 10-1 which are arranged in a two-dimensional matrix form. The pixel 10-1 generates a pixel signal through photoelectric conversion. The vertical scanning circuit 15 outputs driving pulses X-1, X-2 and so on to the pixel unit 10. The amplifying unit 20 amplifies the pixel signal sent from the pixel unit 10. The ramp signal generating circuit 25 generates a ramp signal (reference signal) which changes with respect to time, as a comparison signal to the pixel signal. The comparison unit 30 compares the pixel signal which has been amplified by the amplifying unit 20, with the ramp signal. The counter unit 40 counts the value until the comparison unit 30 outputs a comparison result. The memory unit (correcting unit) 50 holds the count data of the counter unit 40, and carries out a bit shift and a computation for the held data. The horizontal scanning circuit 65 transfers the data sent from the memory unit 50 to the output circuit 60 by using horizontal scanning. The timing generating circuit 70 controls the timings of the above described circuit block, respectively.

The pixel unit 10 has the plurality of the pixels 10-1 arranged on its area, but FIG. 1 illustrates only the 4 pixels for simplification. The lines of each of the pixels 10-1 are sequentially driven by driving pulses X-1 and X-2 to be sent from the vertical scanning circuit 15. The base signal (reset signal) of each of the pixels 10-1 based on the pixel 10-1 at a reset state, and an effective signal (photoelectric conversion signal) of each of the pixels 10-1 based on the pixel 10-1 at a non-reset state are led to the amplifying unit 20 through vertical output lines V-1 to V-n. Each circuit between the amplifying unit 20 and the memory unit 50 is provided with respect to each of the vertical output lines V-1 to V-n. Each amplifying circuit 20-1 of the amplifying unit 20 may have only a function of simply amplifying the signal sent from the pixel 10-1, and may also have a CDS processing function of reducing the noise by subjecting the effective signal and the base signal to the differentiation processing. The influence of the noise, which appears in the comparison unit 30, can be reduced by amplifying the signals in the amplifying unit 20. When the amplifying unit 20 is not provided with the CDS processing function, the inputting portion of the comparison unit 30 can perform the CDS processing.

The comparison unit 30 has a comparator 30-1 which corresponds to the pixel row connecting from the amplifying unit 20, and a selecting circuit 30-2 which selects one signal from the plurality of the ramp signals. The plurality of the ramp signals will be described later in FIG. 3. The comparison unit 30 compares the base signal sent from the amplifying circuit 20-1 with a ramp signal having a smaller time-changing ratio, then determines whether the level of the effective signal is larger or smaller than a comparison voltage, selects the ramp signal to be compared with the effective signal according to the result, and compares the effective signal with the ramp signal. The above described comparison voltage is set in consideration of the SN ratio of the effective signal. The counter unit 40 performs conversion operations twice for one pixel. In the first time, the comparison unit 30 compares the base signal with the ramp signal having a smaller time-changing ratio, and the counter unit 40 down-counts the value from the rising edge of the ramp signal until the output signal of the comparison unit 30 is reversed. The base signal is, for instance, a signal to be output when the input into the amplifying unit 20 is reset, or if the imaging device is structured so as not to have the amplifying unit 20, is a signal to be output when the output of the pixel 10-1 is reset. In the second time, when the level of the effective signal is large, the comparison unit 30 compares the effective signal with a ramp signal having a larger time-changing ratio, and the counter unit 40 corrects resolution ratios of the cases in which the ramp signals have a smaller time-changing ratio and a larger time-changing ratio, and up-counts the value. The consequent A/D conversion data with a large number of bits is held in the memory circuit 50-1 of the memory unit 50. The effective signal is a signal obtained by amplifying a signal which is obtained in the pixel 10-1 through photoelectric conversion and is sent therefrom, with the amplifying unit 20, or is a signal sent from the pixel 10-1 when the imaging device does not have the amplifying unit 20 therein. When the level of the effective signal is small, the comparison unit 30 sequentially compares the effective signal with a ramp signal having a smaller time-changing ratio after the base signal has been down-counted, and the counter unit 40 up-counts the value. The result is held in the memory circuit 50-1 of the memory unit 50 as the A/D conversion data. The A/D conversion data which has been held in the memory circuit 50-1 is transferred to the output circuit 60 by a scanning pulse to be sent from the horizontal scanning circuit 65.

As has been described above, the imaging device 100 compares the base signal with the ramp signal having the smaller time-changing ratio regardless of the level of the effective signal, and accordingly has an effect of being capable of acquiring an A/D conversion data of the base signal with high resolution. The imaging device performs the processing of correcting the A/D conversion data of the effective signal according to the A/D conversion data of the base signal, and consequently can obtain an A/D conversion data with high accuracy and a large number of bits. In addition, one comparator 30-1 compares the effective signal with the ramp signal according to the level of the effective signal, accordingly performs an A/D conversion processing with a small number of bits, and can increase the speed of processing.

Figure 2:
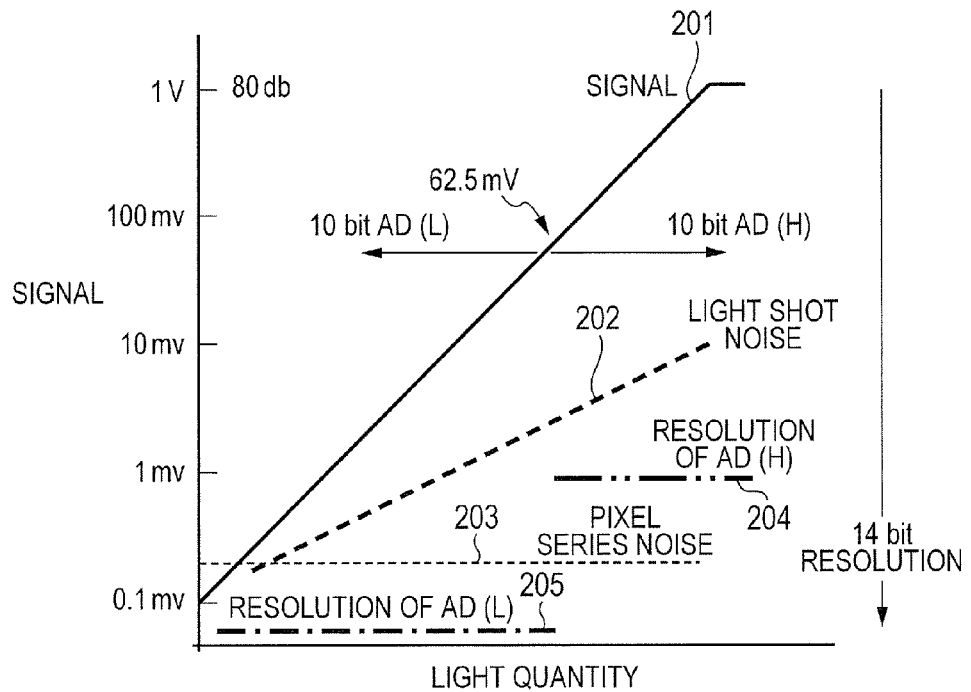
FIG. 2 is an explanatory drawing of an SN ratio of a pixel signal.

FIG. 2 is an explanatory drawing of an SN ratio of a pixel signal for describing an operation principle of an imaging device 100 of FIG. 1. The axis of abscissas in FIG. 2 indicates the quantity of light incident on the pixel 10-1, and the axis of ordinates indicates the level of a signal which has been photoelectrically converted according to the quantity of the incident light, with a logarithmic scale. A solid line 201 indicates the signal, and a signal level of 1 V shall temporarily correspond to 10,000 pieces of photoelectric charge N. A dashed line 202 indicates an optical shot noise, and the amount of the noise is expressed by N, as is well known. A dashed line 203 is a pixel-based noise after CDS, which includes noise that originates in amplifier and does not include noise that originates in A/D conversion. Suppose that the pixel-based noise 203 is 0.2 mV, and an SN ratio which is a ratio of the signal level of 1 V to the pixel-based noise of 0.2 mV becomes 74 dB. In order to perform the A/D conversion which covers this SN ratio, a resolution of approximately 14 bits is needed in consideration of a quantization bit error. As the imaging device has higher resolution, the counter period becomes longer. Accordingly, the imaging device requires an A/D conversion period of time and reads the signal at a low speed. Eventually, the imaging apparatus results in being incapable of taking images at a high speed.

Then, the imaging device of the present embodiment achieves the high-speed readout by reducing the number of bits for the A/D conversion. If the level of a large amplitude signal is temporarily supposed to be 1 V, for instance, the optical shot noise 202 is large. Then, suppose that the optical shot noise is 100 pieces when the level of the large amplitude signal corresponds to 10,000 pieces of electric charges, and the SN ratio is 40 dB. In addition, when the level of a small amplitude signal is temporarily supposed to be 10 mV, the SN ratio is 20 dB. In other words, it is understood that the SN ratio of slightly more than 40 dB is satisfactory for the A/D conversion regardless of the amplitude of the signal.

In FIG. 2, A/D conversion with 10 bits is considered for a large amplitude signal AD (H) and a small amplitude signal AD (L) which are classified by the border of 62.5 mV at which the voltage is 1/16 (equivalent to 4 bits) of the signal of 1 V. The resolution of the A/D conversion for the signal with an amplitude of 1 V is expressed by a chain double-dashed line 204, and the resolution of the A/D conversion for the signal with an amplitude of 62.5 mV is expressed by an alternate long and short dashed line 205. Then, the figure shows that two A/D conversions have both small A/D resolutions even in consideration of a quantization error for an optical shot noise 202 in spite of having A/D conversion accuracy with 10 bits. An A/D conversion data with the accuracy of 14 bits can be obtained in an A/D converter of 10 bits by shifting the bit of these two A/D conversion data. However, because there is the quantization error in the least significant bit of the A/D conversion data of the large amplitude signal AD (H), the A/D conversion data actually does not have the accuracy of 10 bits, and the quantization error becomes larger due to differentiation processing between the effective signal and the base signal.

The conversion for the large amplitude signal and the conversion for the small amplitude signal are performed with 10 bits, respectively, but it corresponds to the change of the resolution for 4 bits because of $2^4=16$ to set the gradient of the ramp signal (reference signal) to be supplied during this conversion, in other words, a ratio of the time-changing ratio of the reference signal at 16. The resolution of 14 bits is created for a signal range of 1 V, by synthesizing both signals having such a relationship. Here, the conversion of the large amplitude signal will be considered. In the present embodiment, the signal is determined to be a large amplitude signal or not, according to whether the signal amplitude is larger than 1/16 of the maximum value of 1 V of the signal amplitude, which is the border. This value is 62.5 mV which is 1,000 mV/16. Accordingly, the border of the determination is 62.5 mV.

On the other hand, when the small amplitude signal is converted, the small amplitude signal up to 62.5 mV which is the border is subjected to the A/D conversion with the use of a ramp signal having a gradient of 1/16 of the ramp signal for the large amplitude signal. Because of this, the resolution 205 of the A/D conversion for the small amplitude signal becomes 1/16 of the resolution 204 of the A/D conversion for the large amplitude signal. Accordingly, the resolution of the A/D conversion with 10 bits for the signal with an amplitude of 62.5 mV becomes 0.0612 mV because of 62.5 mV/1024≈0.0612 mV. The resolution of 0.0612 mV is a sufficiently small value with respect to the value of 0.2 mV of the above described pixel-based noise 203. For information, the signal of 62.5 mV on the border may be handled as any one of the large amplitude signal and the small amplitude signal.

Figure 3:
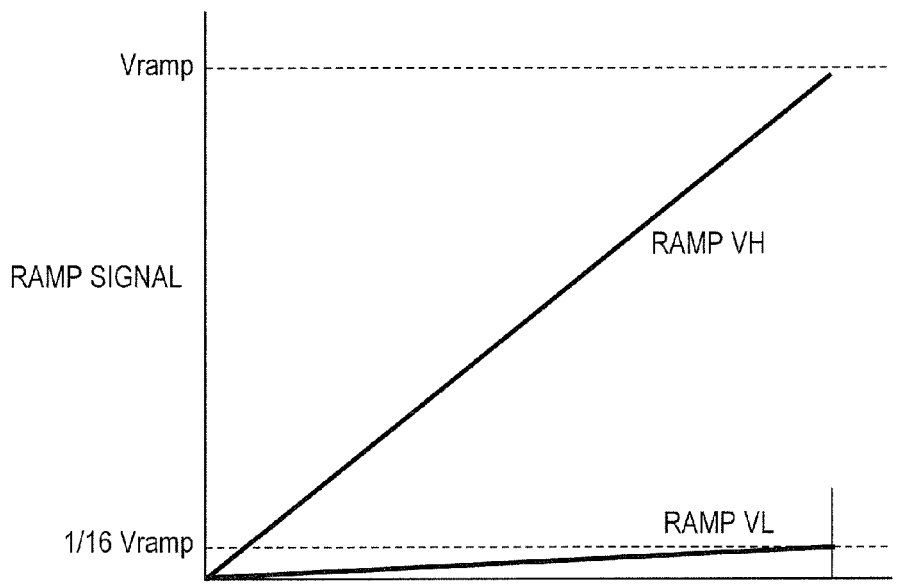
FIG. 3 is an explanatory drawing of a plurality of ramp signals.

FIG. 3 is an explanatory drawing of a plurality of ramp signals according to the present embodiment. FIG. 3 illustrates a gradient which is a time change of a ramp signal. In FIG. 2, a first ramp signal (first reference signal) VH is used for a signal with an amplitude of 62.5 mV or more, and a second ramp signal (second reference signal) VL is used for a signal of less than 62.5 mV. The second ramp signal VL has a smaller gradient (time-changing ratio) than that of the first ramp signal VH. The ratio of gradients of the ramp signals VH and VL is set at 16. When the ratio of the gradients is set at 16, the resolution can be increased by 4 bits. Because the both of the above described AD conversion circuits convert the signals into signals with 10 bits and have the same longest conversion period of time, the clock frequencies of the counter clocks become the same. If the ratio of the gradients is set at 8, the resolution can be increased by 3 bits. In FIG. 2, the resolution of the A/D conversion for the small amplitude signal is sufficiently smaller than that of the system noise, and accordingly the AD conversion circuits may convert the signals into the signals with 9 bits. In this case, if the maximum clock-frequency fmax of the counter is not changed, the conversion period of time of the A/D conversion circuit for 9 bits becomes ½, and the speed can be increased. The ratio of the gradients of the ramp signals and the resolution of the A/D conversion circuit are determined by the number of the saturation electric charge of the pixel, the system noise, the resolution necessary for the imaging device 100 and the like. The ratio of the gradients of the ramp signals VH and VL having different gradients from each other can be multiples of 2. In addition, the counter unit 40 may count the value for the ramp signals VH and VL with counter clocks having the same frequency, or may count the value with counter clocks having different frequencies from each other.

Figure 4:
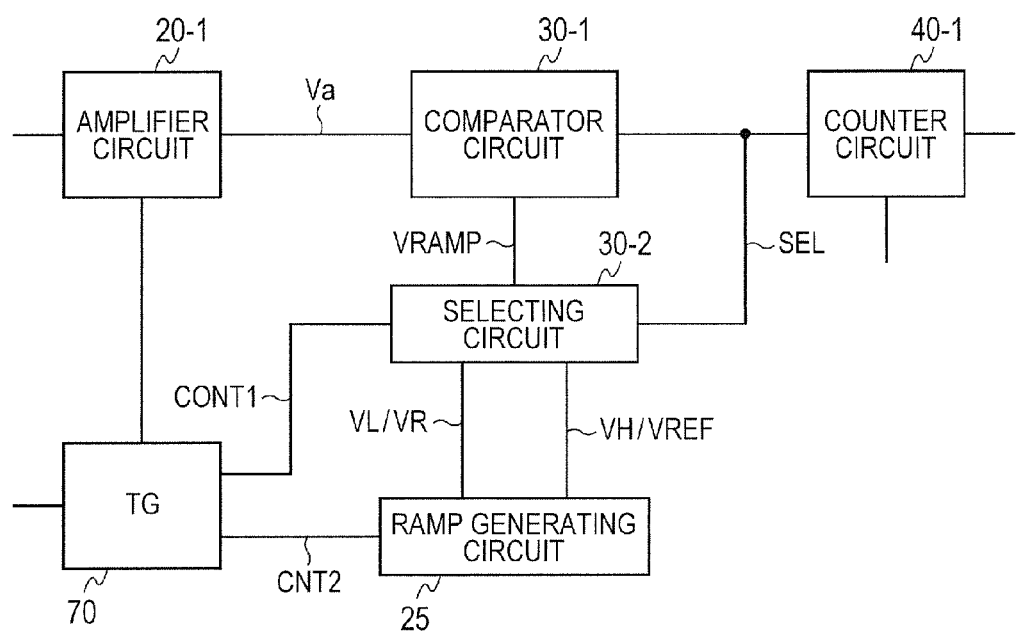
FIG. 4 is a block diagram of an A/D conversion unit of the first embodiment of the present invention.

FIG. 4 is a block diagram of an A/D conversion unit for describing the connection among the comparator 30-1 and circuits in the input and output sides, in the first embodiment of the present invention; and the blocks having the same function as that in FIG. 1 are denoted by the same reference numerals, and the descriptions are omitted. The A/D conversion unit can convert an analog signal which has been photoelectrically converted, into a digital signal at a high speed.

Figure 8:
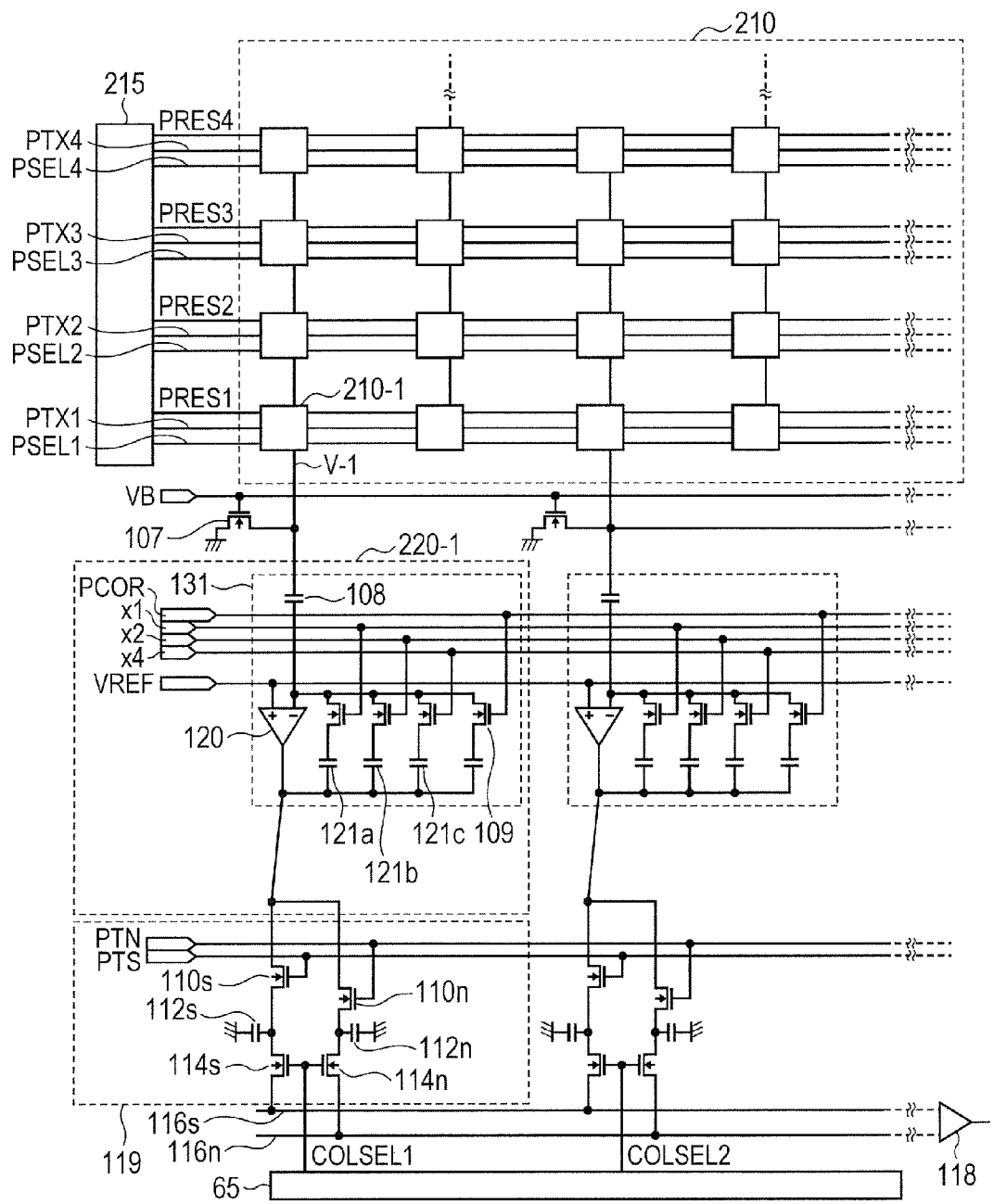
FIG. 8 is a conceptual view illustrating a structure example of the imaging device.

Next, the structure example and the operation of an imaging apparatus having no A/D converter will be described below, in order to facilitate the description of the present embodiment. FIG. 8 is a view illustrating a structure example of a pixel unit 210 and an amplifying circuit 220-1 in an imaging device, and is a view in which a comparison unit 30, a counter unit 40 and a memory unit 50 are omitted. A CDS circuit 119 is provided in the rear stage of the amplifying circuit 220-1. The pixel unit 210 is configured to include a plurality of pixels 210-1 which are arrayed according to a plurality of rows and lines. In FIG. 8, signals which are output from the pixels in rows of the odd numbers when counted from the left are read by a readout circuit arranged in the lower part of the pixel unit 210. On the other hand, signals which are output from the pixels in the rows of the even numbers when counted from the left are read by a not-shown readout circuit arranged in the upper part of the pixel unit 210. Thus, by alternately providing the readout circuits, the area for two rows of the pixel unit 210 can be used when the readout circuit is laid out. The CDS circuit 119 has a function of sampling and holding signals, and reduces correlating components together with a differentiation processing unit 118.

Figure 9:
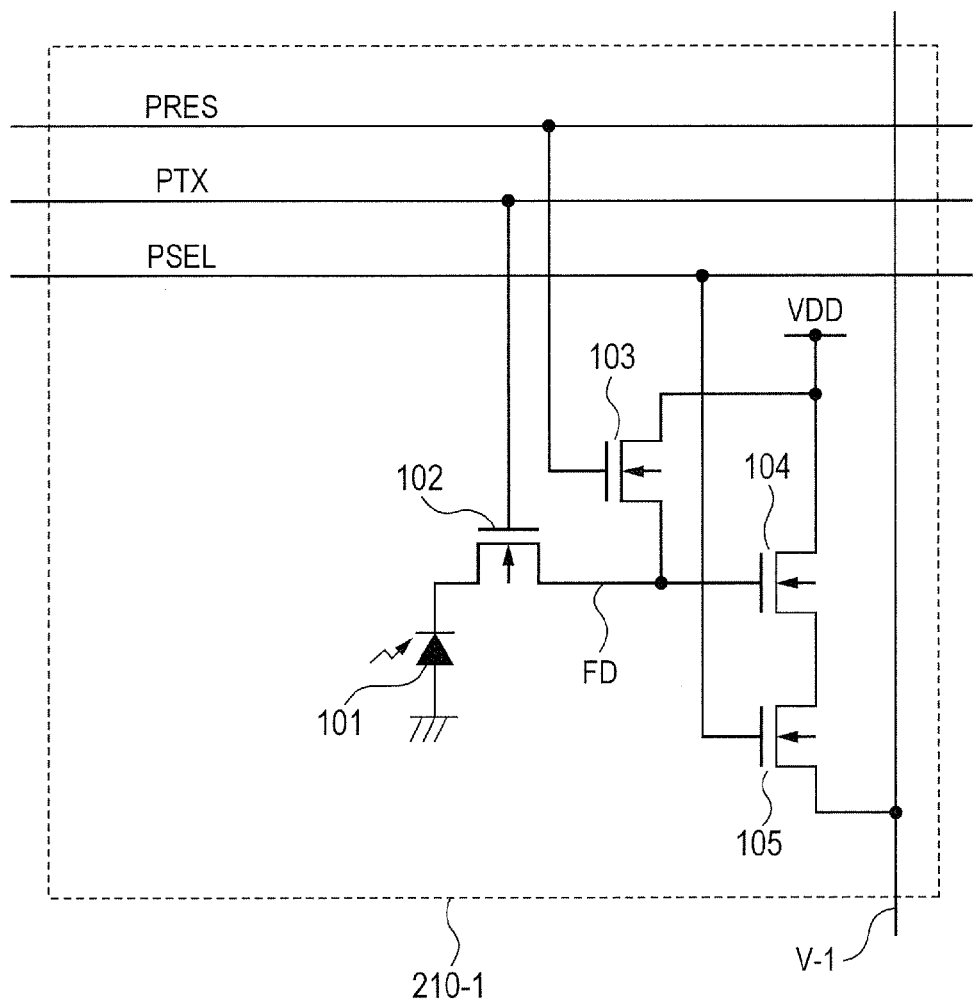
FIG. 9 is an equivalent circuit diagram of a pixel.

FIG. 9 is a circuit diagram of one pixel 210-1. A transfer switch 102 is driven by a transfer pulse PTX. A reset switch 103 is driven by a reset pulse PRES. A line selecting switch 105 is driven by a line selecting pulse PSEL. PTX is a symbol which represents PTX1 to PTXn (n is the number of lines). PRES is a symbol which represents PRES1 to PRESn. PSEL is a symbol which represents PSEL1 to PSELn.

Figure 10:
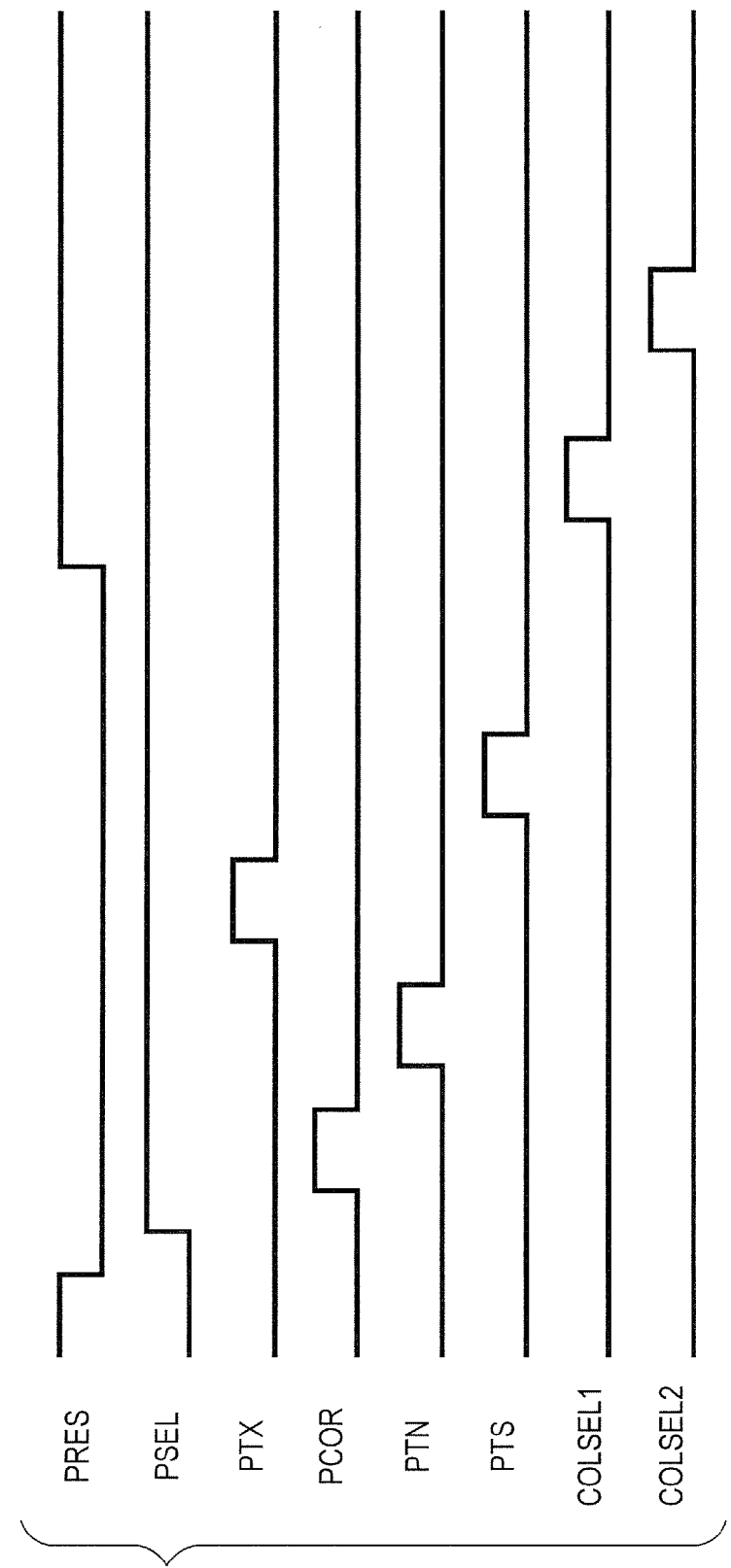
FIG. 10 is a timing chart illustrating an operation example of the imaging device illustrated in FIG. 8.

FIG. 10 is a timing chart illustrating an operation example of the imaging device illustrated in FIG. 8. The operation example of the imaging device will be described below with reference to FIG. 8 to FIG. 10. Prior to a readout operation, the imaging device is exposed to light for a set exposure period of time, and a photoelectric charge is accumulated in a photodiode 101. In the following description, suppose the line to be driven by PRES1, PTX1 and PSEL1 is selected, which are output from a vertical scanning circuit 215.

Firstly, the pixel reset pulse PRES is shifted from a high level to a low level, and the reset of a gate electrode of an amplification MOSFET 104 is cleared. At this time, a potential corresponding to the clearance of the reset is held in a floating diffusion region FD connected to the gate electrode. Subsequently, when a line selecting pulse PSEL becomes a high level, then the output corresponding to the potential of the floating diffusion region FD appears in a vertical output line V-1 by a source follower circuit formed by the amplification MOSFET 104 and a constant current source 107. When a clamp pulse PCOR is activated to a high level in this state, a clamp switch 109 is turned ON, a variable amplifying unit 131 is turned into a voltage follower state, and the voltage of an electrode in a row amplifier side of a clamp capacitor 108 becomes approximately equal to a voltage VREF. After that, the clamp pulse PCOR is non-activated from a high level to a low level, and the output of the vertical output line V-1 is clamped.

Subsequently, an accumulation pulse PTN is activated to a high level, and the offset signal of an amplifying circuit 220-1 is stored in a holding capacitor 112n through a transfer gate 110n. After that, a transfer pulse PTX is activated to a high level, thereby the transfer switch 102 becomes a high level for a fixed period of time, and the photoelectric charge which has been accumulated in the photodiode 101 is transferred to the gate electrode of the amplification MOSFET 104. Here, the electric charge to be transferred is an electron, and when the absolute value of the amount of the transferred electric charge is represented by Q, and when the capacitance of the floating diffusion region FD is represented by CFD, the gate potential is lowered by Q/CFD. In correspondence to this, the potential of the vertical output line V-1 is changed. When the source follower gain is represented by Gsf, the change ΔVvl of the potential Vvl of the vertical output line V-1 due to the transfer of the electric charge from the photodiode 101 to the floating diffusion unit FD is expressed by Expression (1).

$$\Delta Vvl = -Q \cdot Gsf/CFD \quad (1)$$

The voltage of this potential change ΔVvl is amplified by a variable amplifying unit 131 which includes a computation amplifier 120, a clamp capacitor 108 and a feedback capacitor 121, and the output Vct of the variable amplifying unit 131 is expressed by Expression (2).

$$Vct = VREF + Q \cdot (Gsf/CFD) \cdot (C0/Cf) \quad (2)$$

Here, C0 represents the capacitance of the clamp capacitor 108, and Cf represents the capacitance values of feedback capacitors 121a, 121b and 121c to be selected when sensitivity switching pulses ×1, ×2 and ×4 have been activated, respectively. For instance, C0 is 1 pF. When the feedback capacitor 121a has been selected, Cf is 1 pF, when the feedback capacitor 121b has been selected, Cf is 0.5 pF, and when the feedback capacitor 121c has been selected, Cf is 0.25 pF. The voltage amplification ratios represented by −C0/Cf are −1 time, −2 times and −4 times, respectively. In other words, in a system in which negative feedback is applied to the computation amplifier 120, a feedback coefficient which is determined by a voltage division ratio of Cf and C0 is changed by switching the selection to any of the plurality of the feedback capacitors 121a to 121c, and thereby the voltage amplification ratio can be switched. For information, a negative sign attached to the voltage amplification ratio shows that the variable amplifying unit is a reversal amplifying circuit. The transfer pulse PTX becomes a low level, then the accumulation pulse PTS becomes a high level, and the level which is output from the amplifying circuit 220-1 at this time is accumulated in the holding capacitor 112s through the transfer gate 110s.

Subsequently, row selecting switches 114s and 114n are sequentially turned ON by scanning pulses COLSEL1, COLSEL2 and so on generated by a horizontal scanning circuit 65. Then, the signal which is accumulated in the holding capacitor 112s is output to a horizontal output line 116s in the order of the row, and the signal which is accumulated in the holding capacitor 112n is output to a horizontal output line 116n in the order of the row. Pairs of signals in a plurality of rows are sequentially output to the horizontal output lines 116s and 116n. A differentiation processing unit 118 outputs a difference between the pair of the signals in each row which has been output to the horizontal output lines 116s and 116n. Thereby, the noise component contained in the signal held in the holding capacitor 112s can be reduced.

Figure 5:
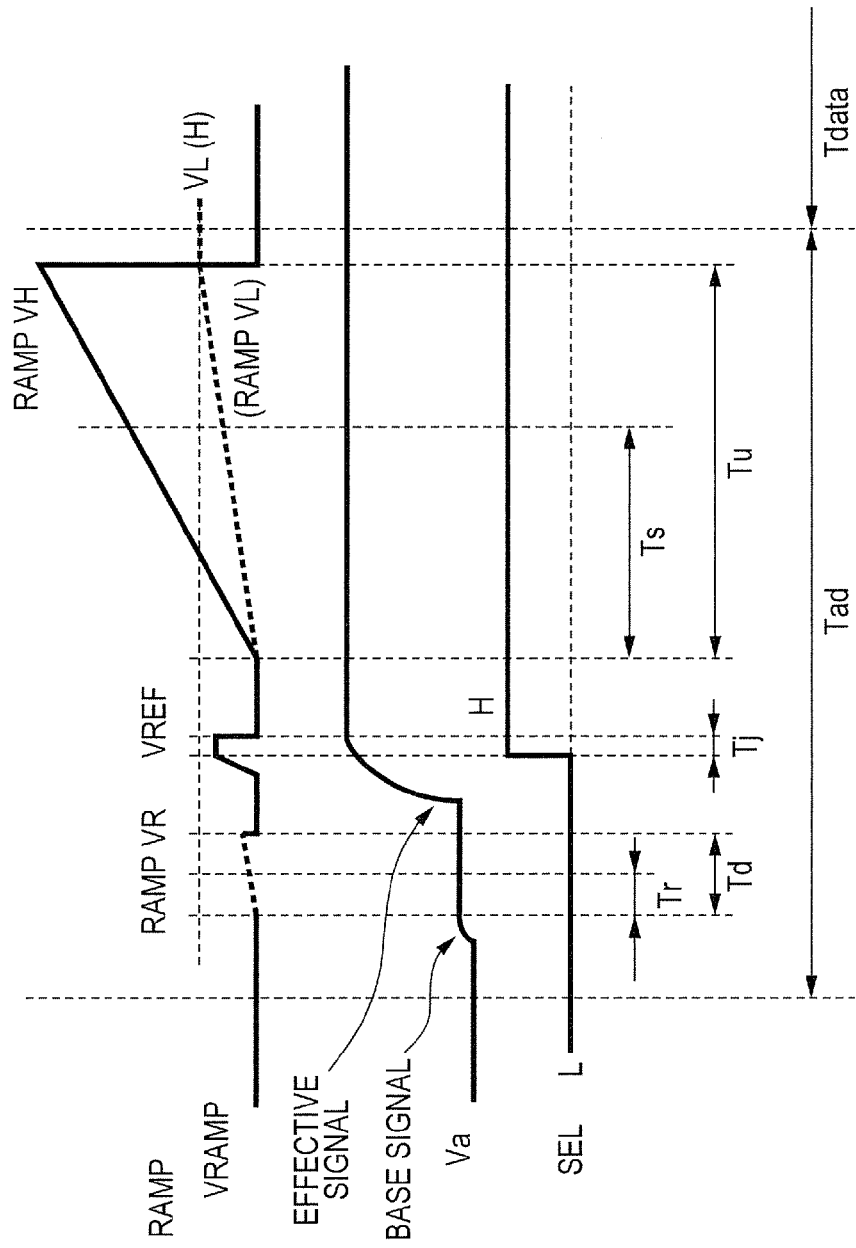
FIG. 5 is a timing chart of the A/D conversion unit of FIG. 4.

FIG. 5 is a timing chart illustrating a method for driving an imaging device 100 of the present embodiment, and is a timing chart particularly of the A/D conversion unit in FIG. 4. An A/D conversion operation will be described below with reference to FIG. 4 and FIG. 5. In FIG. 5, a period of time Tad represents an A/D conversion period of time for a base signal and an effective signal of an analog signal Va, which have been read from a pixel. A period of time Tdata represents a transfer period of time, in which an A/D conversion datum is transferred. In the period of time Tad, a period of time Td represents an A/D conversion period of time for the base signal sent from the pixel, and a ramp signal for the base signal (reference signal for base signal, in other words, the first reference signal) VR represents a comparison signal for the base signal. A period of time Tj represents a signal level determination period of time for the effective signal, and a comparison voltage VREF represents a comparison signal for the effective signal. In addition, a period of time Tu represents an A/D conversion period of time for the effective signal, and a ramp signal for each of the effective signals (reference signal for effective signal, in other words, the second reference signal) VH and VL represents a comparison signal for the effective signal. The output signal Va sent from an amplifying circuit 20-1 takes mainly such forms of the base signal and the effective signal as are illustrated in the figure, and is led to an inputting terminal of a comparator 30-1. A ramp signal VRAMP which is a comparison signal for a signal Va is input into another inputting terminal of the comparator 30-1. Here, when the imaging device has a CDS circuit provided before the comparison unit 30, the base signal corresponds to a signal to be sampled by a signal PTN in FIG. 10. On the other hand, when the imaging device does not have the CDS circuit, the base signal corresponds to a signal to be output to a vertical signal line in response to a reset operation for a floating diffusion unit. Similarly, when the imaging device has the CDS circuit provided before the comparison unit 30, the effective signal corresponds to a signal to be sampled by a signal PTS in FIG. 10. On the other hand, when the imaging device does not have the CDS circuit, the effective signal corresponds to a signal to be output to the vertical signal line by an operation of having transferred an electric charge which has been generated in a photodiode to the floating diffusion unit.

The ramp signal generating circuit 25 is controlled by a control signal CNT2 of a timing generating circuit 70, and generates a ramp signal VH/a comparison voltage VREF, and a ramp signal VL/a ramp signal VR. The ramp signal VH is a ramp signal for higher-order bits with a large gradient, and the ramp signal VL is a ramp signal for lower-order bits with a small gradient. In addition, the comparison voltage VREF is a comparison base signal for determining the level of the effective signal, and the ramp signal VR for the base signal is a ramp signal for comparing the effective signal with the base signal. These four types of ramp signals are selected by a selecting circuit 30-2 which is controlled by a control signal CNT1 of the timing generating circuit 70, and are input to the comparator 30-1. The timing generating circuit 70 also controls the ramp signal generating circuit 25 by the control signal CNT2.

Next, the comparison voltage VREF will be described below. The comparison voltage VREF may be generated from another power supply circuit, but can be generated in a ramp generating circuit 25. The ramp generating circuit 25 can generate the comparison voltage VREF by stopping a charging electric current on the way (for instance, approximately 60 mv) of generating the signal, in a similar way to that of forming the ramp signal VH. The comparison voltage VREF can be generated in a period of time of 1/16 with respect to that of the ramp signal VH. In order to further shorten this period of time, the charging electric current may be increased. In addition, the comparison voltage VREF needs to be set at lower than 62.5 my which is a finally attainable voltage VL(H) of the ramp signal VL. If the voltage is thus set, the effective signal can be surely comparison-processed with any one of the ramp signals VH and VL.

The comparator 30-1 compares the base signal with the ramp signal VR for the base signal during the A/D conversion period of time Td of the base signal, and suppose that Tr represents a period between the time when the ramp signal VR for the base signal has started the change and the time when the magnitude relation between the base signal and the ramp signal is inverted. The counter 40-1 down-counts the value during the period of time Tr, and the memory circuit 50-1 holds the down-counted value (first count value) as a digital datum of the base signal. The ramp signal VR for the base signal has the same gradient as that of the ramp signal VL. By setting the gradient of the ramp signal at the same value, a digital datum of a base signal with high resolution can be obtained. Next, in a signal amplitude determination period of time Tj, the comparator 30-1 compares the effective signal with the comparison voltage VREF. In the example illustrated in the figure, the comparator 30-1 outputs a high-level selection signal SEL which means that the effective signal is larger than the comparison voltage VREF, to the selecting circuit 30-2, in the signal amplitude determination period of time Tj. As a result, in an effective signal A/D conversion period of time Tu, the selecting circuit 30-2 selects the ramp signal VH having a large gradient, and outputs the ramp signal to the comparator 30-1. The comparator 30-1 compares the effective signal with the ramp signal VH. The period spent by the time when the magnitude relation between both of the signals is inverted is represented by Ts. The counter 40-1 up-counts the value for the period of time Ts subsequently to the above described down-counting for the base signal. The memory circuit 50-1 holds the up-counted value (second count value) as a digital datum of the effective signal. If the output of the comparator 30-1 is not inverted in a signal level determination period of time Tj, the selection signal SEL is kept at a low level, and selecting circuit 30-2 selects the ramp signal VL having a small gradient, because the level of the effective signal has been determined to be smaller than the comparison voltage VREF. In this case, the comparator 30-1 compares the effective signal with the ramp signal VL. The selecting circuit 30-2 selects any of the ramp signals VH and VL which have different gradients from each other, according to the level of the effective signal which has been amplified by the amplifying unit 20. In other words, the selecting circuit 30-2 sets the time-changing ratio of the ramp signal, according to the level of the effective signal based on the pixel. The comparator 30-1 compares the ramp signal which has been selected by the selecting circuit 30-2, with the effective signal which has been amplified by the amplifying unit 20. The counter 40-1 up-counts the value in a period between the time when the ramp signal has started the change and the time when the comparator 30-1 outputs a signal which indicates that the magnitude relation between the effective signal and the ramp signal has been inverted.

In FIG. 5, the ramp signal VR for the base signal and the ramp signal VL have the same gradient, as described above. The ramp signal VR for the base signal is compared with the base signal, but the base signal is also a base signal for the effective signal, accordingly the ramp signal needs to have high accuracy. Because the ramp signal VR has the same gradient as that of the ramp signal VL for generating a datum with lower-order bits, there is such a merit as to be capable of using the same ramp generating circuit 25. The functions of the down-counting mode and the up-counting mode of the counter 40-1 will be described later with reference to FIGS. 6A to 6C.

Suppose that the pixel signal sent from the pixel unit 10 is a signal 201 described in FIG. 2, and then the gain of the amplifying circuit 20-1 in FIG. 4 is 1. However, an imaging system which will be described later in FIG. 7 has a function of setting sensitivity suitable for a photographing environment. For instance, when the sensitivity setting is 16 times, the amplifying circuit shall amplify a signal level of 62.5 mV in FIG. 2 to 1 V and input the amplified signal to the comparator 30-1. At this time, an SN ratio necessary for A/D conversion shows its sufficient effect, if having the resolution of the A/D conversion with 10 bits, which is obtained by comparing the large amplitude signal with the ramp signal VH. Accordingly, if the sensitivity has been set at 16 times or more, the selecting circuit 30-2 may be controlled so as to select the ramp signal VH by the control signal CONT1 sent from the timing generating circuit 70, and output the ramp signal VH to the comparator 30-1. Because the SN ratio of the pixel unit 10 is largely affected by the aperture area of the pixel unit 10, the ratio of the gradients of the ramp signal VH and the ramp signal VL and the sensitivity setting for selecting the above described ramp signal VH vary according to the aperture area.

FIGS. 6A to 6C are views for illustrating a structure example of a counter (correcting unit) 40-1. The counter 40-1 counts the value until the output of the comparator 30-1 is inverted when the base signal has been compared with the ramp signal VR for the base signal, and when the effective signal has been compared with one of the ramp signals VH and VL for the effective signal. When the comparator 30-1 compares the base signal with the ramp signal, the counter 40-1 down-counts the value. In contrast to this, when the comparator 30-1 compares the effective signal with the ramp signal, the counter 40-1 up-counts the value. Then, the memory unit (correcting unit) 50 shifts the bit of the count data in order to correct the resolution ratio.

FIG. 6A is a view illustrating a structure example of the counter 40-1. FIGS. 6B and 6C are views for describing processing in the memory unit (correcting unit) 50. FIG. 6B is a view illustrating the case in which the base signal has been compared with the ramp signal VR for the base signal and then the effective signal is larger than the comparison voltage VREF, and illustrating the count data when the effective signal has been compared with the ramp signal VH. FIG. 6C is a view illustrating the case in which the base signal has been compared with the ramp signal VR for the base signal and then the effective signal is smaller than the comparison voltage VREF, and illustrating the count data when the effective signal has been compared with the ramp signal VL.

The counter 40-1 has an inverter 601, a 4 bit up/down counter 602, a 10 bit up/down counter 603, and switches SW1 and SW2. The count clock signal CLK is input into the switches SW1 and SW2. The inverter 601 outputs a logic reversal signal of the selection signal SEL. The switch SW1 is controlled by the output signal of the inverter 601. The switch SW2 is controlled by the selection signal SEL. The counter clock signal CLK is input into any one of clock terminals of the 4 bit up/down counter 602 and the 10 bit up/down counter 603, according to the selection signal SEL.

FIG. 6B illustrates the case in which the effective signal is larger than the comparison voltage VREF. In the case, the selection signal SEL becomes a high level, and the comparator 30-1 compares the effective signal with the ramp signal VH. In the period of time Tr, the selection signal SEL becomes a low level. Then, the counter clock signal CLK is input into the clock terminal of the 4 bit up/down counter 602, by the switch SW1. The carry output (carryout) co of the 4 bit up/down counter 602 is output to the clock terminal of the 10 bit up/down counter 603, by the switch SW2. The 4 bit up/down counter 602 synchronizes with the counter clock signal CLK, down-counts the value, and outputs data D0 to D3. The 10 bit up/down counter 603 synchronizes with the carry output co of the 4 bit up/down counter 602, down-counts the value, and outputs data D4 to D6. The down-counted value (first count value) of the base signal becomes data D0 to D6. Next, in the period of time Ts, the selection signal SEL becomes a high level. Then, the counter clock signal CLK shall not be input into the clock terminal of the 4 bit up/down counter 602, by the switch SW1. The counter clock signal CLK is output to the clock terminal of the 10 bit up/down counter 603, by the switch SW2. The 10 bit up/down counter 603 synchronizes with the counter clock signal CLK, up-counts the value, and outputs the up-counted value to the memory unit 50. The memory unit 50 shifts the bit of the up-counted value by 4 bits, and stores the 10 bits data D4 to D13 of which the bit has been shifted by 4 bits, as data Da4 to Da13. The memory unit 50 also stores the output 4 bits data D0 to D3 of the Obit up/down counter 602, as the data Da0 to Da3. Consequently, the data become Da0 to Da13, which have been subjected to differentiation processing between the effective signal and the base signal, in the 4 bit up/down counter 602 and the 10 bit up/down counter 603. The 14 bits data Da0 to Da13 correspond to the data D0 to D13, respectively, and are stored in the memory circuit 50-1. Thus, A/D conversion data D4 to D13 which have been obtained by the comparison between the effective signal and the ramp signal VH are subjected to 4-bit shift with respect to the data D0 to D6 which have been obtained by the comparison between the base signal and the ramp signal VR for base signal, and are subjected to differentiation processing. Thereby, 14 bits A/D conversion data Da0 to Da13 with high accuracy are obtained.

FIG. 6C illustrates the case in which the effective signal is smaller than the comparison voltage VREF. In the case, the selection signal SEL becomes a low level, and the comparator 30-1 compares the effective signal with the ramp signal VL. In the period of time Tr, the base signal is down-counted similarly to that in FIG. 6B. The down-counted values (second count value) become the data D0 to D6. Next, in the period of time Ts, the selection signal SEL becomes a low level. Then, the counter clock signal CLK is input into the clock terminal of the 4 bit up/down counter 602, by the switch SW1. The carry output (carryout) co of the 4 bit up/down counter 602 is output to the clock terminal of the 10 bit up/down counter 603, by the switch SW2. The 4 bit up/down counter 602 synchronizes with the counter clock signal CLK, and up-counts the value. The 10 bit up/down counter 603 synchronizes with the carry output co of the 4 bit up/down counter 602, up-counts the value, and outputs the 10 bits data D0 to D9 to the memory unit 50. Dummy data D10 to D13 are "0". The data D0 to D9 are stored as the data Da0 to Da9, the dummy data D10 to D13 are stored as the data Da10 to Da13, and the 14 bits data Da0 to Da13 are stored, respectively in the memory unit 50. Consequently, the data become Da0 to Da9, which have been subjected to the differentiation processing of the effective signal and the base signal in the 4 bit up/down counter 602 and the 10 bit up/down counter 603. The dummy data D10 to D13 are added as the data Da10 to Da13. The 14 bits data Da0 to Da13 are stored in the memory circuit 50-1. The dummy data D10 to D13 mean that because the signal is a small amplitude datum, a high-rank bit is 0.

As described above, the imaging device uses such count data obtained by subjecting the base signal to comparison processing with the ramp signal VR for the base signal so as to have high resolution, when the effective signal and the base signal are subjected to the differentiation processing, regardless of whether the effective signal is the large amplitude signal or the small amplitude signal. Thereby, the imaging device can obtain an A/D conversion data which is little affected by a quantization noise and has high accuracy. In FIG. 6B, the imaging device can also acquire the A/D conversion data Da0 to Da13 with 14 bits by using 10 bits data D4 to D13 of which the bit has been shifted by 4 bits.

The comparator 30-1 compares the base signal based on the pixel with the ramp signal VR for the base signal in a period of time Td, and the counter 40-1 counts the first count value in the period of time Tr until the magnitude relation between the base signal based on the pixel and the ramp signal VR for the base signal is inverted. After that, the comparator 30-1 compares the effective signal based on the pixel with one of the ramp signals VH and VL for the effective signal in the period of time Tu, and the counter 40-1 counts the second count value in the period of time Ts until the magnitude relation between the effective signal based on the pixel and one of the ramp signals VH and VL for the effective signal is inverted. The counter 40-1 and the correcting unit of the memory unit 50 correct a difference between the resolutions of the first count value and the second count value, which corresponds to a difference between time-changing ratios of the ramp signal VR for the base signal and one of the ramp signals VH and VL for the effective signal. Then, the memory unit (correcting unit) 50 outputs difference data Da0 to Da13 of the first count value and the second count value, which have been corrected. Specifically, in the case of FIG. 6B, the memory unit (correcting unit) 50 corrects the difference of the resolutions by shifting the bit of the second count value.

In the above description, the first count value has been down-counted in the period of time Tr and the second count value has been up-counted in the period of time Ts, but the counting method may be reversed. The counter 40-1 may up-count the first count value in the period of time Tr and down-count the second count value in the period of time Ts to thereby output the difference data Da0 to Da13 of the first count value and the second count value. In other words, the counter 40-1 down-counts or up-counts the first count value, and counts the second count value so that the direction becomes an opposite direction to the up or down direction at the time when the first count value has been counted. Thereby, the memory unit (correcting unit) 50 can output the difference data Da0 to Da13 of the first count value and the second count value, which have been corrected.

In the above description, an example was described in which the counter 40-1 having count functions of the down-count mode and the up-count mode carries out the above described differentiation processing, but the method is not limited by this example. The differentiation processing for the effective signal and the base signal may also be carried out when the counter result is transferred from the memory unit 50 to the output circuit 60 after the counter result of the base signal and the effective signal has been stored in the memory, when the result is transferred from the output circuit 60 to the outside of the imaging device 100, or even in an external circuit (for instance, video signal processing circuit unit 830 in FIG. 7). At this time, if a flag data which recognizes a signal determination level (selection signal SEL) with respect to the comparison voltage VREF is added to the A/D conversion data, the imaging device results in easily coping with any bit shift method. The A/D conversion data which the counter unit 40 outputs is output together with the flag data that indicates the level of the effective signal.

Second Embodiment

Figure 7:
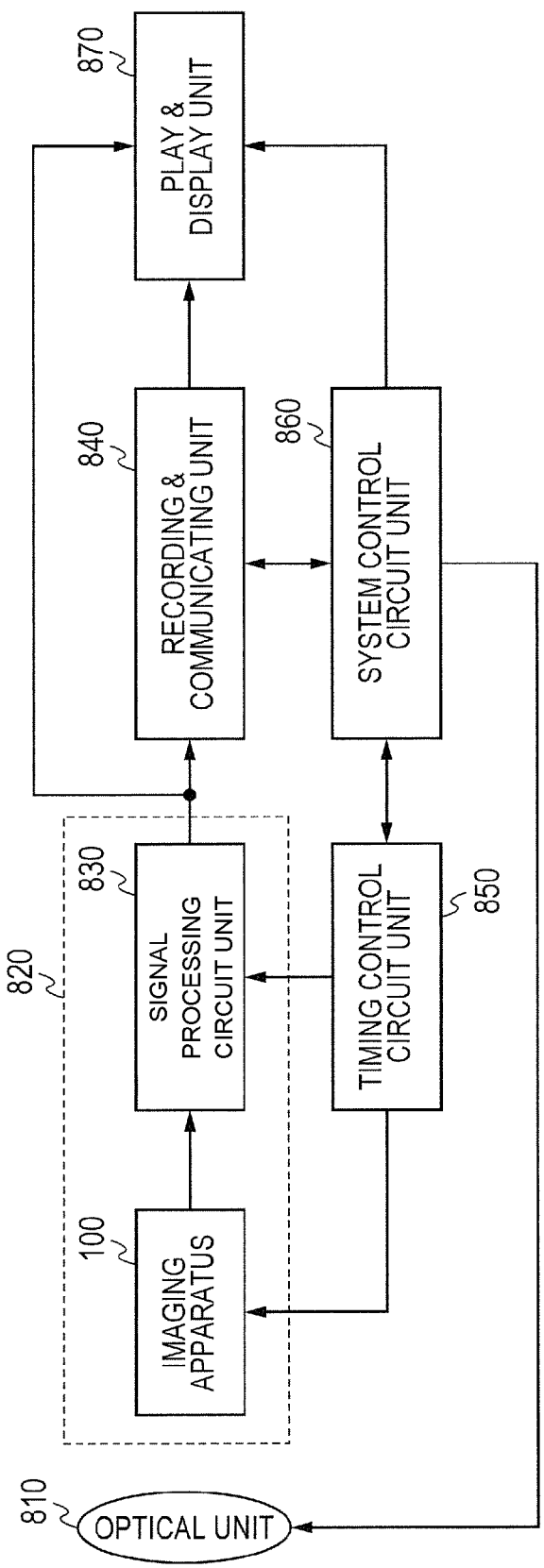
FIG. 7 is a block diagram of an imaging system.

FIG. 7 is a view illustrating a structure example of an imaging system according to a second embodiment of the present invention. The imaging system 800 includes, for instance: an optical unit 810; an imaging device 100; a signal processing circuit unit 830; a recording and communicating unit 840; a timing control circuit unit 850; a system control circuit unit 860; and a play and display unit 870. An imaging apparatus 820 has the imaging device 100 and the signal processing circuit unit 830. The imaging device 100 which has been described in the first embodiment is used for the above described imaging device 100.

The optical unit 810 that is an optical system such as a lens images light emitted from an object on a pixel unit 10 (FIG. 1) of the imaging device 100, on which a plurality of pixels are two-dimensionally arrayed, and forms an image of the object on the pixel unit 10. The imaging device 100 outputs signals according to the light imaged on the pixel unit 10, on the timing based on signals output from the timing control circuit unit 850. The signals output from the imaging device 100 are input into the signal processing circuit unit 830 that is a signal processing unit, and the signal processing circuit unit 830 processes the signal with a specified method by a program or the like. The signal processing circuit unit 830 may submit the input signals to signal processing such as bit shift processing and differentiation processing illustrated in FIG. 6. The signals obtained by the processing in the signal processing circuit unit 830 are sent to the recording and communicating unit 840 as an image data. The recording and communicating unit 840 sends signals for forming an image to the play and display unit 870, and makes the play and display unit 870 play or display a moving image or a still image. The recording and communicating unit 840 also communicates with the system control circuit unit 860 by receiving the signal from the signal processing circuit unit 830, and also performs an operation of recording signals for forming an image on an unillustrated recording medium.

The system control circuit unit 860 is a unit for collectively controlling an operation of the imaging system, and controls a drive of each of the optical unit 810, the timing control circuit unit 850, the recording and communicating unit 840, and the play and display unit 870. In addition, the system control circuit unit 860 is provided, for instance, with an unillustrated storage unit that is a recording medium, and records a program and the like which are necessary for controlling the operation of the imaging system, in the storage unit. The system control circuit unit 860 also supplies, for instance, a signal which switches driving modes according to an operation of a user, into the imaging system. Specific examples include: a signal for a change of a line to be read or a line to be reset; a signal for a change of an angle of view, which accompanies an operation of an electronic zoom; and a signal for a shift of an angle of view, which accompanies electronic vibration control. The timing control circuit unit 850 controls the driving timings for the imaging device 100 and the signal processing circuit unit 830 based on the control by the system control circuit unit 860 which is a control unit.

As described above, according to the first and second embodiments, the imaging device compares a base signal of a pixel with a ramp signal VR for the base signal with high resolution, regardless of whether the effective signal of the pixel is a large amplitude signal or a small amplitude signal. The imaging device determines a level of the effective signal, then selects one of a ramp signal VH and a ramp signal VL, which is suitable for the determined signal, and acquires an A/D conversion data through differentiation processing which corrects a resolution ratio of the effective signal and the base signal; and thereby can obtain the A/D conversion data with high accuracy and multi-bits.

In a dark photographing environment, a pixel signal tends to be a small amplitude signal though depending on an exposing condition, and the sensitivity can be enhanced by amplifying the pixel signal. In the first embodiment, the sensitivity can be enhanced by amplifying a signal in an amplifying circuit 20-1. When a signal sent from the pixel unit 10 is input into a comparator 30-1 without being amplified, the sensitivity can be consequently enhanced by changing the gradient of the ramp signal. The imaging device in the first and second embodiments do not principally determine the gradient of the ramp signal, but can change the gradient of the ramp signal according to the requested enhancement of sensitivity, and when the sensitivity is intended to be enhanced by twice, for instance, can control the gradient of the ramp signal to one half.

Note that the above embodiments are merely examples how the present invention can be practiced, and the technical scope of the present invention should not be restrictedly interpreted by the embodiments. In other words, the present invention can be practiced in various ways without departing from the technical concept and main features of the invention. For instance, though a ramp signal of which the level changes linearly with respect to time has been described as a reference signal, a ramp signal of which the level changes stepwise with respect to time may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-196349, filed Sep. 8, 2011, which is hereby incorporated by reference herein in its entirety.

What is claimed is:

1. An imaging apparatus comprising:
    a photoelectric conversion unit configured to generate an electric charge by photoelectric conversion; and
    a comparator configured to perform a first comparison operation of comparing a signal based on the electric charge with a comparison signal, and configured to perform a second comparison operation,
    wherein, in a first case that a result of the first comparison operation indicates that an amplitude of the signal based on the electric charge is less than an amplitude of the comparison signal, the second comparison operation is performed to compare the signal based on the electric charge with a first reference signal having a voltage changing to a first voltage in a first time-changing ratio,
    in a second case that the result of the first comparison operation indicates that the amplitude of the signal based on the electric charge is greater than the amplitude of the comparison signal, the second comparison operation is performed to compare the signal based on the electric charge with a second reference signal having a voltage changing in a second time-changing ratio greater than the first time-changing ratio, and an amplitude of the comparison signal is less than an amplitude of the first voltage.

2. The apparatus according to claim 1, wherein the comparator compares a base voltage with the first reference signal to a second voltage having an amplitude that is less than an amplitude of the first voltage, and the amplitude of the comparison signal is greater than the amplitude of the second voltage.

3. The apparatus according to claim 2, wherein an amplitude of the voltage of the second reference signal changes to an amplitude of a third voltage, the amplitude of the third voltage being greater than the amplitude of the first voltage, and the amplitude of the first voltage is greater than a value calculated by dividing the third voltage by a value calculated by dividing the second time-changing ratio by the first time-changing ratio.

4. The apparatus according to claim 1, further comprising:

a selecting circuit configured to select the second reference signal among a plurality of reference signals, as a reference signal to be used in the second comparison operation, when a result of the first comparison operation indicates the amplitude of the signal based on the electric charge is greater than the amplitude of the comparison signal, and configured to select the first reference signal among the plurality of reference signals, as a reference signal to be used in the second comparison, when the result of the first comparison operation indicates the amplitude of the signal based on the electric charge is less than the amplitude of the comparison signal.

5. The apparatus according to claim 1, further comprising:

an A/D conversion unit including the comparator, and configured to generate a first digital signal by the second comparing operation in the first case, and a second digital signal by the second comparing operation in the second case; and a correcting unit configured to perform a correction of at least one of the first digital signal and the second digital signal, so as to reduce a difference between a resolution of the first digital signal and a resolution of the second digital signal.

6. The imaging apparatus according to claim 5, wherein the correcting unit performs the correction by a bit shift of the second digital signal.

7. An imaging system comprising:

an imaging apparatus; and a signal processing unit for processing a signal output from the imaging apparatus, wherein the imaging apparatus comprises:

a photoelectric conversion unit configured to generate an electric charge by photoelectric conversion; and a comparator configured to perform a first comparison operation of comparing a signal based on the electric charge with a comparison signal, and configured to perform a second comparison operation, wherein, in a first case that a result of the first comparison operation indicates that an amplitude of the signal based on the electric charge is less than an amplitude of the comparison signal, the second comparison operation is performed to compare the signal based on the electric charge with a first reference signal having a voltage changing to a first voltage in a first time-changing ratio, in a second case that a result of the first comparison operation indicates that the amplitude of the signal based on the electric charge is greater than the amplitude of the comparison signal, the second comparison operation is performed to compare the signal based on the electric charge with a second reference signal having a voltage changing in a second time-changing ratio greater than the first time-changing ratio, and an amplitude of the comparison signal is less than an amplitude of the first voltage.

* * * * *